United States Patent [19]

Goldman

[11] 4,257,747
[45] Mar. 24, 1981

[54] MONITORING MACHINERY BY DETECTING VIBRATIONS

[75] Inventor: Steven A. Goldman, West Nyack, N.Y.

[73] Assignee: The Nash Engineering Company, Norwalk, Conn.

[21] Appl. No.: 970,088

[22] Filed: Dec. 15, 1978

[51] Int. Cl.³ .................... F04B 49/10; F04B 49/00
[52] U.S. Cl. ...................................... 417/63; 417/68; 73/651
[58] Field of Search ................ 417/1, 44, 63, 53, 68; 73/651; 318/460; 200/61.45 R

[56] References Cited

U.S. PATENT DOCUMENTS

| | | | |
|---|---|---|---|
| 2,946,218 | 7/1960 | Karpchuk | 73/651 |
| 3,095,532 | 6/1963 | Floyd | 318/460 |
| 3,195,034 | 7/1965 | Bensema | 417/44 |
| 3,232,521 | 1/1966 | Deardorff et al. | 417/68 |
| 3,676,723 | 7/1972 | Drucker | 200/61.45 R |
| 4,028,510 | 6/1977 | Yamaura | 200/61.45 R |
| 4,099,667 | 7/1978 | Uchida | 318/460 |

FOREIGN PATENT DOCUMENTS

| | | | |
|---|---|---|---|
| 555595 | 8/1943 | United Kingdom | 73/651 |
| 743687 | 1/1956 | United Kingdom | 73/651 |
| 893170 | 4/1962 | United Kingdom | 200/61.45 |

*Primary Examiner*—William L. Freeh
*Attorney, Agent, or Firm*—Robert R. Jackson; John A. Howson

[57] ABSTRACT

A piece of machinery which, in an abnormal operating condition exhibits a vibration frequency characteristic of or peculiar to that condition, is monitored by securing a spring and mass unit to the machinery, the spring and mass unit having a natural frequency equal to said vibration frequency so that upon the occurence of the abnormal condition the magnified vibration of the spring and mass unit can be used to effect a control function or sound an alarm.

3 Claims, 3 Drawing Figures

MONITORING MACHINERY BY DETECTING VIBRATIONS

BACKGROUND OF THE INVENTION

The invention is concerned with apparatus for, and a method of, monitoring machinery which in an abnormal operating condition exhibits a vibration frequency peculiar to or characteristic of, that condition. A typical piece of machinery of this kind and in connection with which the present invention has been developed is a liquid ring pump. In such a pump of the circular lobe type it has been found that as the compressor stalls, that is to say it operates with a malformed ring, a spike appears in the vibration spectrum at 1 and $\frac{1}{3}$ times the compressor operating speed. This spike is either low or non-existent in a normally operating pump. It is desired to sound an alarm or close the pump down or perform some other monitoring function when this condition exists.

It will be recognized that while the invention has been developed for and has particular application in the monitoring of compressors and pumps of the liquid ring type, it is equally applicable to any machinery which exhibits the aforementioned characteristic.

DESCRIPTION OF THE PRIOR ART

Broad band vibration detection cannot be used to perform the monitoring of a spike peculiar to an abnormal operating condition since in many pieces of machinery there are many higher peaks in the vibration spectrum during normal operation of the machinery and during the abnormal condition sought to be detected than that characteristic of the condition. Therefore, the present state of the art would indicate that the solution would be to mount an accelerometer or velocity probe on the pump and pass the signal generated by that probe to a filter centered at the frequency to be detected and use the output of the filter to control a switching device to sound an alarm or shut off the pump. Such a solution, while feasible, is extremely costly.

The monitoring of overall vibration levels is exemplified in U.S. Pat. Nos. 3,676,723 (Drucker); 3,699,287 (Stahl et al.); 3,700,355 (Anderson et al.) and 3,716,122 (Baker et al.). These devices clearly are inappropriate to monitor a frequency which has a lower amplitude level than other frequencies existent in the spectrum at both normal and abnormal operating conditions of the machinery.

An alternative form of monitoring would be to mount the pick up of a spectrum analyzer upon the machinery and then decode the output of that analyzer by means of a computer to trigger an alarm device or shut-down device. Again, this type of arrangement is extremely expensive.

SUMMARY OF THE PRESENT INVENTION

The present invention seeks to provide a simple and inexpensive device for detecting a vibration frequency characteristic of an abnormal operating condition of a piece of machinery, and to utilize that device to sound an alarm or to close down the machinery. According to the present invention there is provided a simple spring and mass unit connected to the machinery and selected to have a natural frequency equal to the vibration frequency characteristic of the abnormal operating condition to be detected. With such an arrangement with a relatively small amplitude at the frequency to be detected the resultant movements of the mass are magnified and may be used to perform a switching function. Specifically, the movement of the mass may serve to close a circuit to an alarm or to means for closing down the machinery.

DESCRIPTION OF THE FIGURES OF THE DRAWINGS

An embodiment of the invention is illustrated, schematically, in the accompanying drawings in which.

DESCRIPTION OF THE PREFERRED EMBODIMENT

Figure 1:
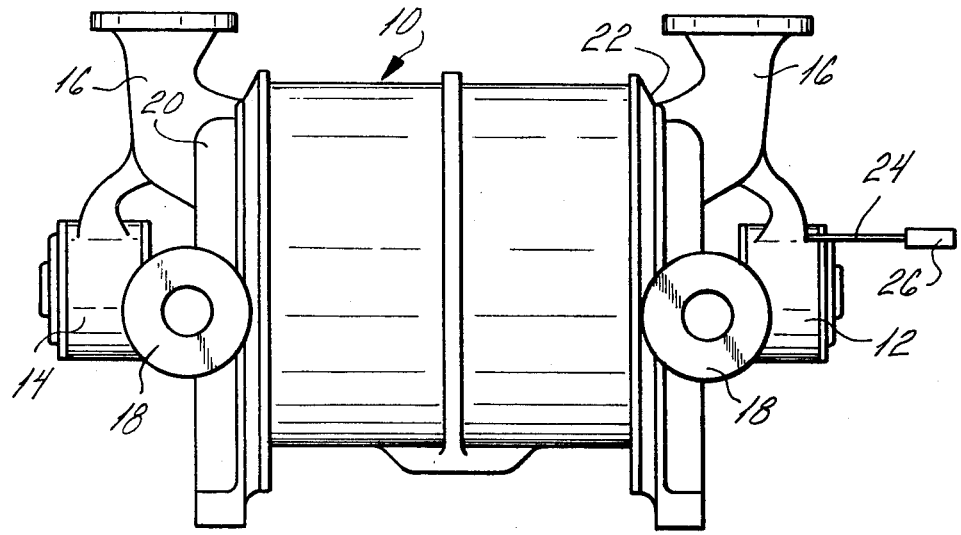
FIG. 1 is an elevational view of a liquid ring pump embodying the present invention.

In FIG. 1 there is shown a liquid ring pump having a cylindrical casing 10 within which there is disposed a vaned rotor. The rotor is mounted upon a shaft supported in bearings in bearing housings 12 and 14, the shaft being eccentric to the casing. Inlet conduits 16 and discharge conduits 18 lead to heads 20 and 22 which include port members to distribute a gas to be handled by the pump to working chambers or buckets defined by the vanes of the rotor. In entirely conventional fashion, seal liquid is introduced to the interior of the casing and is caused, by rotation of the rotor, to form a ring adhering to the interior surfaces of the casing. Since the rotor is eccentric to the casing the inner surface of the ring of seal liquid alternately advances towards and recedes from the rotor axis to produce a pumping action in the buckets of that rotor.

During operation of such pumps it is possible for the pump to stall which is a condition which exists when the ring becomes malformed. It is possible for this condition to remain undetected and if this is the case serious erosion or other mechanical damage of the various pump surfaces can occur.

By observation of this type of pump it has been determined that a spike occurs in the vibration spectrum of the pump which is either low or non-existent during normal operation but which becomes more pronounced when a stall condition exists. To detect this particular frequency, a spring 24 is secured to bearing housing 12 and mounted upon that spring is a mass 26. The spring and mass are so selected as to have a natural frequency equal to that of the spike in the vibration spectrum of the pump which is peculiar to the stalled condition.

Figure 2:
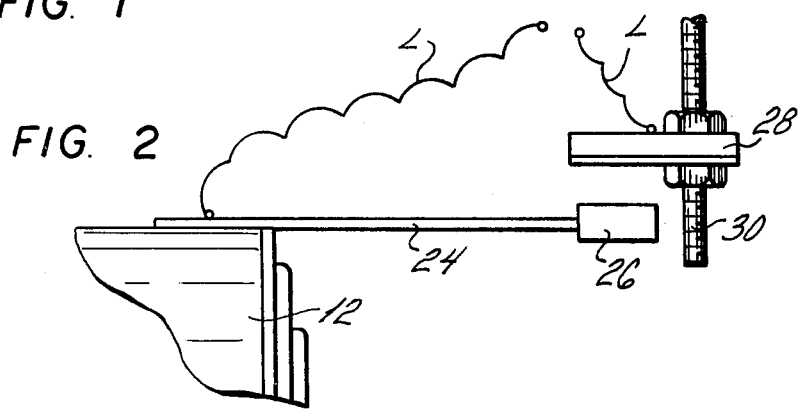
FIG. 2 is a detail of the device of FIG. 1.
Figure 3:
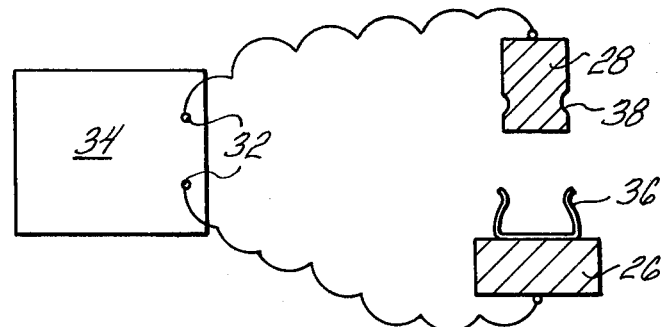
FIG. 3 shows, schematically, a detail of the equipment in FIG. 2.

Referring to FIGS. 2 and 3, the mass 26 is disposed adjacent to a stop device 28 which is adjustably mounted upon a screw threaded element 30 so that its spacing from the at-rest position of mass 26 may be adjusted. The stop element 28, the mass 26 and spring 24 are electrically conductive and leads L are connected to those devices and to terminals 32 of a monitoring unit 34 (see FIG. 3).

Upon the occurrence of the spike in the vibration spectra peculiar to a stalled condition, the mass will vibrate over a considerable amplitude and will be brought into contact with the stop element 28 to complete the circuit to the monitoring unit 34. As can be seen in FIG. 3 the mass 26 is provided with a spring clip 36 which engages with appropriate configurations 38 of stop element 28 so that when the mass is brought into contact with the stop element it is held captive until deliberately released.

By arranging that the stop element 28 is adjustable relative to the at-rest position of the mass 26, the amplitude of vibration of the mass necessary to complete the circuit can be adjusted. It will readily be recognized that the natural frequency of the spring mass system (given $\omega_n = \sqrt{K/M}$ by $\omega_n = \sqrt{K/M}$ where K is the spring constant and M is the mass) can be set to whatever value is desired depending upon the particular frequency of the vibration spectrum which is to be sought. Since the shape of a resonant response curve is a function of mass, spring constant and damping ratio, it is apparent that the device of the present invention can be finely tuned rather simply to be selective as to which frequency would be observed. Also, because of the amplifying effect of the device it is possible to attach that device to a stationary part of the machine to which the vibrations are generated by a moving part are transmitted.

What is claimed is:

1. An apparatus for monitoring a piece of machinery which, in an abnormal operating condition, exhibits a vibration frequency characteristic of that condition, said apparatus comprising a spring connected adjacent one end to said piece of machinery, a mass connected adjacent the other end of said spring so that movement of said mass relative to said piece of machinery is normally constrained solely by said spring, the combination of said mass and said spring having a natural frequency of oscillation equal to said vibration frequency so that, substantially only upon the occurrence of vibrations of said frequency, substantial oscillation of said mass occurs, means spaced from the normal position of said mass in the path of oscillation of said mass for engaging and holding said mass when said mass reaches said means for engaging and holding as a result of said substantial oscillations, and means associated with the means for engaging and holding for producing an output signal indicative of the occurrence of said abnormal operating condition of said piece of machinery when said mass reaches said means for engaging and holding.

2. An apparatus for monitoring a piece of machinery which, in an abnormal operating condition, exhibits a vibration frequency characteristic of that condition, said apparatus comprising a spring connected adjacent one end to said piece of machinery, a mass connected adjacent the other end of said spring so that movement of said mass relative to said piece of machinery is normally constrained solely by said spring, the combination of said mass and said spring having a natural frequency of oscillation equal to said vibration frequency so that, substantially only upon the occurrence of vibrations of said frequency, substantial oscillation of said mass occurs, a mechanical latch spaced from the normal position of said mass in the path of oscillation of said mass for engaging and holding said mass when said mass reaches said latch as a result of said substantial oscillations, and means associated with said latch for producing an output signal indicative of the occurrence of said abnormal operating condition of said piece of machinery when said mass reaches said latch.

3. The apparatus defined in claim 2 wherein said means for producing an output signal comprises an electrical circuit which is completed by contact of said mass with said latch.

* * * * *